United States Patent
Reumerman et al.

(10) Patent No.: US 8,514,791 B2
(45) Date of Patent: Aug. 20, 2013

(54) MAC PROTOCOL FOR CENTRALLY CONTROLLED MULTICHANNEL WIRELESS LOCAL AREA NETWORKS

(75) Inventors: Hans-Juergen Reumerman, Eindhoven (NL); Georgios Orfanos, The Hague (NL); Jelena Mirkovic, Aachen (DE); Bernhard Walke, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 782 days.

(21) Appl. No.: 12/374,909

(22) PCT Filed: Jul. 24, 2007

(86) PCT No.: PCT/IB2007/052950
§ 371 (c)(1),
(2), (4) Date: Jun. 4, 2009

(87) PCT Pub. No.: WO2008/012766
PCT Pub. Date: Jan. 31, 2008

(65) Prior Publication Data
US 2009/0279509 A1 Nov. 12, 2009

Related U.S. Application Data

(60) Provisional application No. 60/833,094, filed on Jul. 24, 2006, provisional application No. 60/950,841, filed on Jul. 19, 2007.

(51) Int. Cl.
*H04W 4/00* (2009.01)

(52) U.S. Cl.
USPC .................................... 370/329; 370/335

(58) Field of Classification Search
USPC .................................... 370/335, 329
See application file for complete search history.

(56) References Cited

U.S. PATENT DOCUMENTS

| | | | |
|---|---|---|---|
| 6,603,388 B1* | 8/2003 | Perraud et al. | 340/5.61 |
| 2002/0071449 A1 | 6/2002 | Ho et al. | |
| 2002/0111158 A1* | 8/2002 | Tee | 455/421 |
| 2004/0053620 A1* | 3/2004 | Garrison et al. | 455/448 |
| 2005/0018706 A1* | 1/2005 | Myojo | 370/445 |
| 2005/0053015 A1* | 3/2005 | Jin et al. | 370/254 |
| 2006/0050742 A1* | 3/2006 | Grandhi et al. | 370/506 |
| 2008/0165746 A1* | 7/2008 | Sung et al. | 370/337 |
| 2009/0103483 A1 | 4/2009 | Higuchi et al. | |

FOREIGN PATENT DOCUMENTS

| | | | |
|---|---|---|---|
| EP | 1659737 A2 | 5/2006 | |
| EP | 1659737 A3 | 7/2006 | |
| JP | 2004153558 A | 5/2004 | |
| JP | 2005210210 A | 8/2005 | |
| JP | 2006287664 A | 10/2006 | |

OTHER PUBLICATIONS

Orfanos et al., "MC-CDMA based IEEE 802.11 wireless LAN", IEEE Conference Proceeding, 2004, pp. 400-405.
Chang et al., "MCDA: an efficient multi-channel MAC protocol for 802.11 wireless LAN with directional atenna", IEEE Conference Proceeding, 2005, pp. 64-67, vol. 2.

(Continued)

*Primary Examiner* — Sai-Ming Chan

(57) ABSTRACT

A wireless system and method of wireless communication are described.

13 Claims, 4 Drawing Sheets

(56) References Cited

OTHER PUBLICATIONS

Heier., "Leistungsbewertung der UMTS Funkschnittstelle", Dissertation, 2003, Aachen University, ISBN 3-86073-167-9, German, English abstract.

IEEE 802.11e/D9: Wireless LAN Medium Access Control (MAC) and physical layer (PHY) specifications: Medium Access Control (MAC) Enhancements for Quality of Service (QoS), Technical Specification, IEEE LAN/MAN Standard Committee. IEEE, Aug. 2004.

* cited by examiner

MAC PROTOCOL FOR CENTRALLY CONTROLLED MULTICHANNEL WIRELESS LOCAL AREA NETWORKS

The wireless communication bandwidth has significantly increased with advances of channel modulation techniques, making the wireless medium a viable alternative to wired and optical fiber solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few.

Each wireless network includes a number of layers and sub-layers. The Medium Access Control (MAC) sub-layer and the Physical (PHY) layer are two of these layers. The MAC layer is the lower of two sublayers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Division Multiple Access (CDMA), Carrier Sensing Multiple Access (CSMA), Frequency Division Multiple Access (FDMA) and Time Division Multiple Access (TDMA).

As is known, in a WLAN having a centralized MAC protocol, and among other functions, an access point (AP) provides control over allocation of access to the system by other wireless stations (STAs) accessing the WLAN. The control of the WLAN by the AP serves to reduce collisions of communications packets between STAs and the AP and between the STAs themselves. By properly controlling the access to the medium, collisions are avoided, decreasing dropped packets, and increasing the throughput of the WLAN.

As is known, many WLANs include multi-channel (or multicarrier) MACs (MC-MACs). While MC-MACs allow for greater medium access by the STAs, the demands on the AP are further increased by the need to provide control over more channels. In known WLANs, this can result in increased 'overhead' or system requirements, which can both adversely impact the complexity of the system and the cost of its implementation.

In accordance with a representative embodiment, a method of wireless communication includes: providing a plurality of code channels (cchs) in a single frequency channel; allocating at least one contention free period (CFP) in at least one of the code channels; and allocating at least one contention period (CP) in another code channels commencing concurrently with the CFP.

In accordance with another representative embodiment, a wireless network includes: a plurality of wireless stations (STAs); an access point (AP) operative to grant access to a wireless medium to the STAs; a superframe having a plurality of code channels (cchs) in a single frequency channel; at least one contention free period (CFP) in at least one of the code channels; and at least one contention period (CP) in another code channel commencing concurrently with the CFP.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
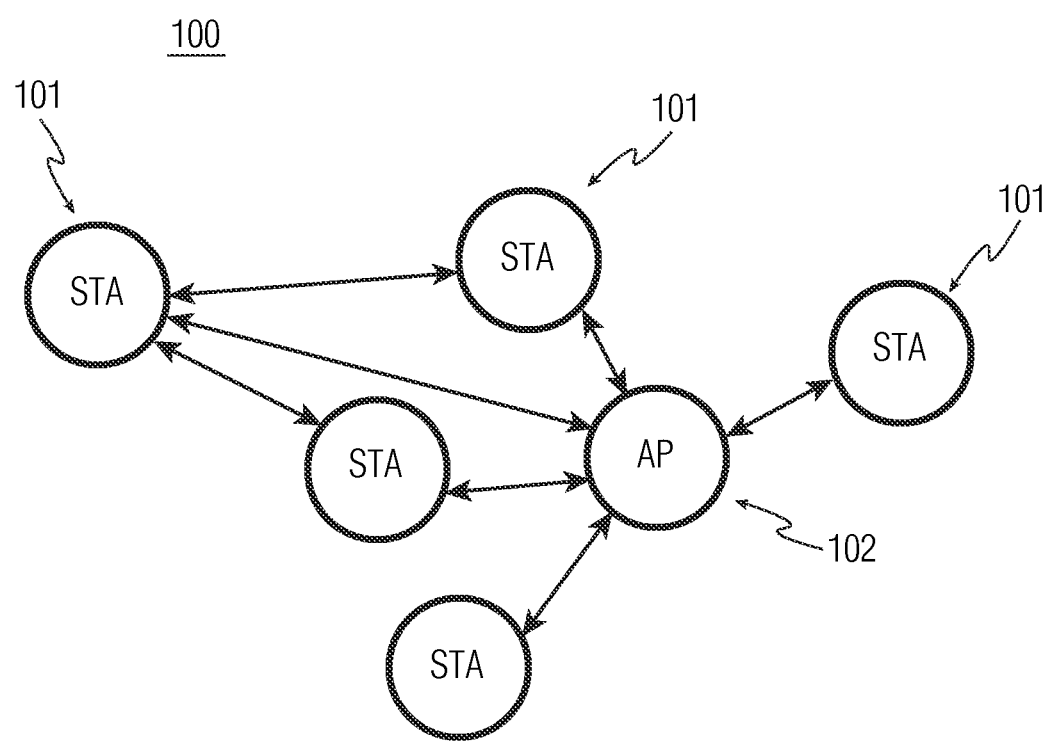
FIG. 1 is a simplified schematic diagram of a WLAN in accordance with a representative embodiment.

In the following detailed description, for purposes of explanation and not limitation, example embodiments disclosing specific details are set forth in order to provide a thorough understanding of the example embodiments. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the present invention. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture. The wireless network includes wireless stations (STAs) with updated (newer) modulation and frame formats as well as legacy STAs. Illustratively, the network may be one which functions under the IEEE 802.11 standard (legacy) and includes one or more wireless stations having a MAC layer in compliance with IEEE 802.11n or any of their progeny. As will be appreciated from a review of the present disclosure, the MC-MACs of the illustrative embodiments are CDMA-based systems. However, the present teachings are not limited to MAC layers governed by the IEEE 802.11 standard and the application of the teachings is contemplated in other networks/protocols. These include, but are not limited to: cellular networks; wireless local area networks (WLAN); time division multiple access (TDMA) protocol; CSMA; CSMA with collision avoidance (CSMA/CA); and frequency division multiple access (FDMA). It is emphasized that these protocols are merely illustrative and that protocols other than those specifically mentioned may be used without departing from the example embodiments. Moreover, the example embodiments are applicable to a variety of centralized networks that include STAs that function under updated modulated and frame formats as well as legacy STAs.

FIG. 1 is a schematic diagram of a wireless network 100 in accordance with an example embodiment. The wireless network 100 includes a centralized MAC layer within an AP (HOST) 102, which illustratively operates according to one of the plurality of illustrative protocols referenced above. The AP 101 services a number of first STAs (wireless devices) 101 according to the chosen protocol. Illustratively, the network 100 is a WLAN, a wide area network (WAN) or mobile telephone network, and the STAs (devices) 102 are computers, mobile telephones, personal digital assistants (PDA), or similar device that typically operates in such networks. As indicated by the two-way arrows, the devices 101 may communicate bilaterally; and the AP 102 and devices 101 may communicate bilaterally.

It is noted that according to certain MAC layer protocols, communication from one device of the STAs to another of the STAs is not direct; rather such communications pass through the host 102, which then transmits the communications (using known scheduling methods) to the correct recipient device 101.

It is further noted that while only a few STAs 101 are shown, this is merely for simplicity of discussion. Clearly, many other devices 101 may be used. Finally, it is noted that the devices 101 are not necessarily the same. In fact a plethora of different devices that function under the chosen protocol(s) may be used within the network 100.

Figure 2:
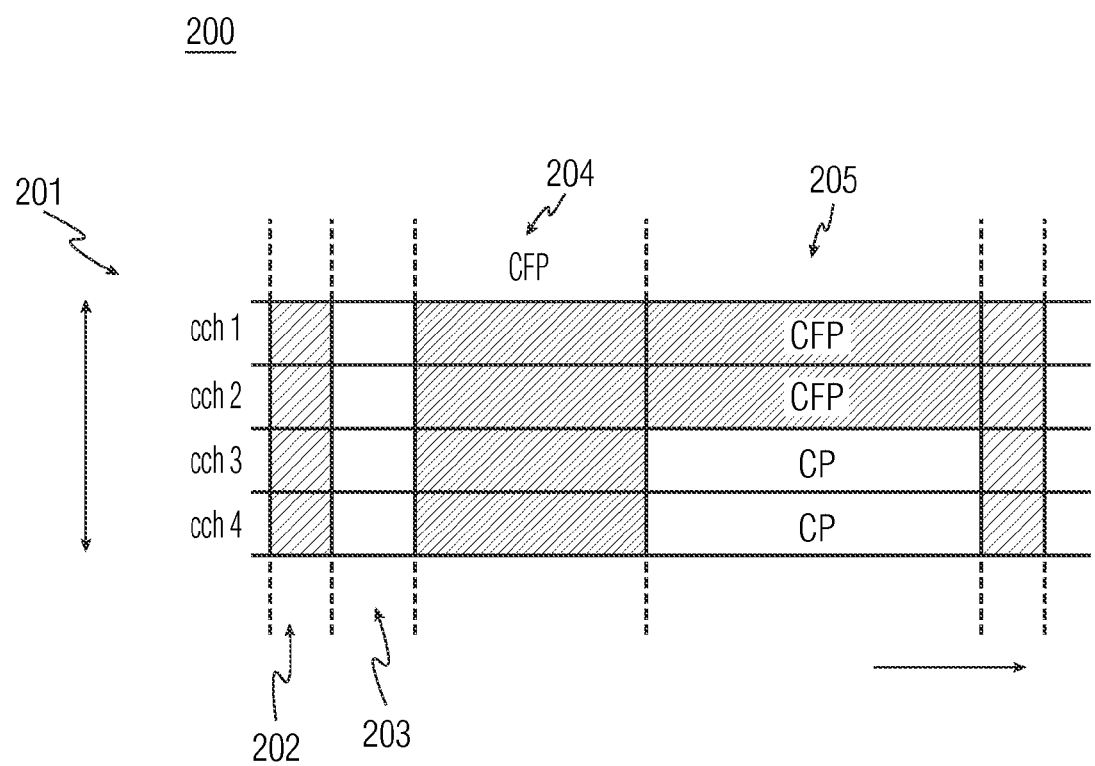
FIG. 2 is a conceptual view of a superframe structure with contention periods (CPs) and contention free periods (CFPs) in accordance with a representative embodiment.

FIG. 2 is a timeline 200 in accordance with the example embodiment and illustrates the basic features of time division in WLANs in accordance with a representative embodiment. The timeline 200 is best understood when reviewed in conjunction with the illustrative embodiments of FIG. 1. The interval shown, which starts with the transmission of a beacon 201 and its duration equals to Target Beacon Transmission Time (TBTT), is defined as superframe 201 and consists the basic element of the centralized mode.

The superframe of FIG. 2 illustrates the bandwidth allocation of one frequency channel. Naturally, the tenets are usefully applied to a plurality of frequency channels, which are controlled by the AP 102 and the MC-MAC of the WLAN 100. Only one channel is discussed in detail to avoid obscuring the description of illustrative embodiments. The channel is partitioned into subchannels in time and code, and the subchannels are referred to as code channels (cchs), which are indicated in FIG. 2. The time division of the code channels provides CPs and CFPs. During CPs, network operation follows the rules of C-DCF, described in G. Orfanos, J. Habetha, L Liu, "MC-CDMA based IEEE 802.11 wireless LAN," Proc. IEEE MASCOTS 2004, October 2004; and during CFPs the AP 102 has control over the network as provided by 802.11a/e. The referenced IEEE publication is specifically incorporated herein by reference.

As will be appreciated, during CPs, the STAs 101 have essentially unfettered access to a sub-channel or code channel (cch); and during a CFP, the cch access is assigned by the AP 102. Division of available resources is done in both time and code domain, according to the broadcast information contained in the beacon. Notably, the allocated band of an example is illustrated in FIG. 2, where CP is operated in code channel (cch) 3 and cch 4 for 60% of the superframe duration.

At selected intervals the AP 102 of the (centralized) network 100 transmits the beacon. As is known, the period between the beacons 202 is often referred to as a superframe. The beacons are received within the range of the network 100. In an example embodiment, the STAs 101 request service within the network 100. For example, the STAs 101 may operate under the 802.11 protocol. Such a protocol is often referred to as a 'listen before talk' protocol. As such, request-to-send (RTS) and clear-to-send (CTS) exchanges between the STAs 101 and the AP 102 may occur after the receipt of the beacon. As can be appreciated, this process continues while one or more of the devices remain in the range of the host 101. Upon termination of a first superframe interval, another beacon is transmitted indicating the commencement of a second superframe interval.

The AP 102 transmits the (first) beacon during beacon period 202 immediately after its initialization, and signals the networks operation characteristics. Besides the information contained in the IEEE 802.11a beacon, the AP 102 states the duration of the CFPs 204 for each cch as shown in FIG. 2. Such a different allocation of CFP/CP among the cchs adds flexibility to the network. STAs, which initiate a new connection, can use the CP for their first transmissions, thus reducing their delay until they are granted resources for CFP. Additionally, STAs with lower load or best effort traffic can operate in CP continuously. It must be noted that the total duration of CFP depends on the network traffic and can be adjusted by the AP, per cch, in every superframe.

At the termination of the beacon period, and after termination of a guard interval (not shown), a cumulative CTS (CTScum) 203 transmission is undertaken by the AP 102. In a representative embodiment, the CTScum 203 transmission provides all CTS commands to all STAs 101 of the network 100. To this end, each STA 101 transmits one or more RTS to the AP 102. CTScum 203 is transmitted in all cchs, and contains information for the forthcoming transmissions during CFP in each cch, thereby providing medium access grants to requiring STAs. Each access grant (CFP) contains the addresses of the corresponding transmitter and receiver establishing a connection. Alternatively, the access grant contains connection identifiers.

Illustratively, an extra byte CTScum signals the periodic repetition of prior stated access grants until the end of superframe, in order to reduce overhead. As such, each STA 102 is apprised of the CFPs in each cch. Each STA 101 garners the allocated time and subchannel for accessing the medium from this broadcast. Beneficially, the CTScum 203 reduces the overhead of the MC-MAC and improves the quality of service (QoS) as a result.

After the termination of the CTScum 203, each cch is in a respective CFP 205. The CFP 205 requires function under IEEE 802.1x or under the teachings of the referenced IEEE publication incorporated above. During this period, the AP 102 maintains control of the medium, with access thereto having been granted during the beacon period 202 or the CTScum 203. The AP 102 also states the duration of the CFP 205 for each cch.

After the termination of the CFP 205, the respective cchs enter one of a CP or CFP under period 206 of the superframe 201. During this portion of the superframe 201, some of the cchs are restricted to CFP access by the STAs 101, while some allow unfettered access to the channel by the STAs 101. Upon termination of the period 206, the next superframe commences with the next beacon period as shown in FIG. 2.

A few general observations are worthy of discussion. First, the order of the CFP period 205 and the period 206 is merely illustrative. Notably, the time order of these periods may be reversed from that shown in FIG. 2. Furthermore, the AP 102 broadcasts the allocation of the periods 205 and 206, and particularly the number, identity and timing of the cchs that are respectively controlled (CPs) and that allow unfettered access (CFPs) within period 206. The AP 102 determines the requirements based on the RTS packets received from the STAs 101 during the previous superframe and allocates the access accordingly in an attempt to meet the requests and to provide adequate QoS, among other known benefits.

As will be appreciated by one of ordinary skill in the art having had the benefit of the present disclosure, the allocation of CFP/CP among the cchs in period 206 adds flexibility to the network 100. For example, STAs 101, which initiate a new connection between themselves and the AP 102 and between themselves, can use the CP for their first transmissions, thus reducing their delay until they are granted resources for CFP. Additionally, STAs 101 with lower load or best effort traffic can operate in CP continuously. It must be noted that the total duration of CFP depends on the network traffic and can be adjusted by the AP 102, per cch, in every superframe.

In accordance with illustrative embodiments, channel bandwidth division in many parallel cchs enables the operation of centralized and decentralized mode in parallel, which is very important for the support of different traffic characteristics in a network. In systems with variable Spreading Factor (SF), one cch could be reserved for signalization and transmissions during CP, where the spreading factor will define its capacity. Such a channel is useful for at least the following reasons:

1. Since any STA 101 can use this cch for sending an access request for CFP at any time, access delay reduces.

2. Unpredictable beacon delays and collisions from the operation of CP and CFP on the same channel can be more readily avoided, since separation of two transmission periods takes place in code domain, rather than the usual Time Division Duplex (TDM) method of IEEE 802.11a/e.

3. STAs 101 with high quality of Service (QoS) requirements (e.g., STAs used in medical or emergency applications) can transmit throughout the time in CFP, where transmission delays can be guaranteed.

Additionally, the present teachings further contemplate division of available resources among CP and CFP in both time and code domain, according to the broadcast information contained in the beacon. The position of CP in code domain and its duration may vary in each superframe. Furthermore, signaling to the AP or any other controlling entity of the network, or to the peer receiver, the amount of data to be sent, by the transmission of an RTSapp frame. The RTSapp frame contains either the amount of data to be transmitted, or a request for transmissions according to a traffic class. Also, signaling of the downlink, uplink, direct link, forwarding traffic to be transmitted during CFP in a control frame (e.g. CTScum). This frame contains information for the forthcoming transmissions during CFP in each cch, the so called access grants. Each medium access grant contains the addresses of the corresponding transmitter and receiver establishing a connection.

Alternatively, the access grant contains connection identifiers. An extra byte CTScum signals the periodic repetition of prior stated access grants until the end of superframe. In addition, for ultimo connections, the AP can schedule in the CTScum frame the transmissions in all hops within its area of control, reducing the delay and number of medium access attempts at multihop connections. Also, header compression can be achieved, if during association each MAC entity gets a unique ID by the AP. The MAC entities can then be distinguished by the given ID and the AP MAC address. Also disclosed is the hardware devices that use the above described methods.

Figure 3:
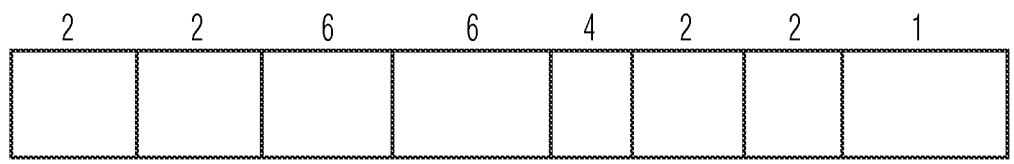
FIG. 3 is a conceptual view of a request to send application frame (RTSapp) format in accordance with a representative embodiment.

FIG. 3 is a conceptual view of a request to send application frame (RTSapp) format in accordance with a representative embodiment. The STAs request CFP resources for transmission by sending the RTSapp frame to the AP. This frame is sent during a CP, following the C-DCF access rules, and contains either the amount of data to be transmitted, or a request for transmissions according to a traffic class. The latter defines a transmission rate, which guides the AP to schedule appropriately transmissions for this MS. Further details of this may be found in S. Heier. Leistungsbewertung der UMTS Funkschnittstelle. Dissertation, Aachen University, 2003, ISBN 3-86073-167-9). Moreover, a maximum tolerable delay may be provided in accordance with, for example, IEEE 802.11e/D9: "Wireless LAN Medium Access Control (MAC) and physical layer (PHY) specifications: Medium Access Control (MAC) Enhancements for Quality of Service (QoS), Technical Specification, IEEE LAN/MAN Standard Committee. IEEE, August 2004." The disclosures of the dissertation and the IEEE specification are specifically incorporated herein by reference.

Figure 4:
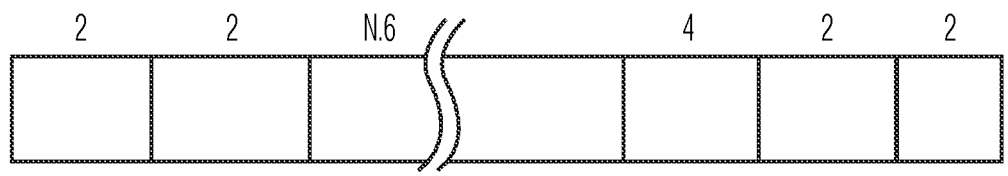
FIG. 4 is a conceptual view of a clear to send cumulative (CTScum) frame in accordance with a representative embodiment.

FIG. 4 is a conceptual view of a clear to send cumulative (CTScum) frame in accordance with a representative embodiment. Beacon transmission is followed, after a guard interval of, for instance, one slot, by the transmission of the Clear To Send cumulative (CTScum) frame. As noted previously, and like the beacons, CTScum is transmitted in all cchs, and contains information for the forthcoming transmissions during CFP in each cch, the so called access grants. Each access grand contains the addresses of the corresponding transmitter and receiver establishing a connection. Alternatively, the access grant contains connection identifiers. An extra byte CTScum signals the periodic repetition of prior stated access grants until the end of superframe, in order to reduce overhead.

In order to further reduce overhead, the present teachings contemplate address compression in centralized mode. To this end, STAB 101, upon association with the AP 102, garner a unique, one byte long address, which is used as their identifier, instead of the 6 byte long addresses of the standard. One byte is enough to support 255 STAB in a subnetwork, and together with the subnetwork identifier, provide a distinct address to each STA. Furthermore, the number of addresses in MAC, needed for an explicit differentiation between STAB, can be reduced to a minimum of three (from 4) bytes, consisting the source, destination and subnetwork address. Further details may be found in IEEE 802.11 Wireless LAN Medium Access Control (MAC) and physical layer (PHY) specifications: Wireless LAN Medium Access Control (MAC) and physical layer (PHY) specifications, Technical Specification, IEEE LAN/MAN Standard Committee. IEEE, July 1999; and Std.802.11e/D9. Wireless LAN Medium Access Control (MAC) Enhancements for Quality of Service (QoS), Technical Specification, IEEE LAN/MAN Standard Comitee. IEEE, August 2004.The disclosures of the referenced IEEE specifications are specifically incorporated herein by reference.

According to the access grants, STAs initiate transmissions in the cchs with the predefined order. The correct reception of a data packet is acknowledged with an Acknowledgement (ACK) frame, transmitted after time Short InterFrame Space (SIFS). As SIFS is mainly defined by the transmitter turn-around time, the same interval separates the ACK from the next data frame, in order to allow consecutive transmissions of data packets from the same MS. An example is given in FIG. 5.

Figure 5:
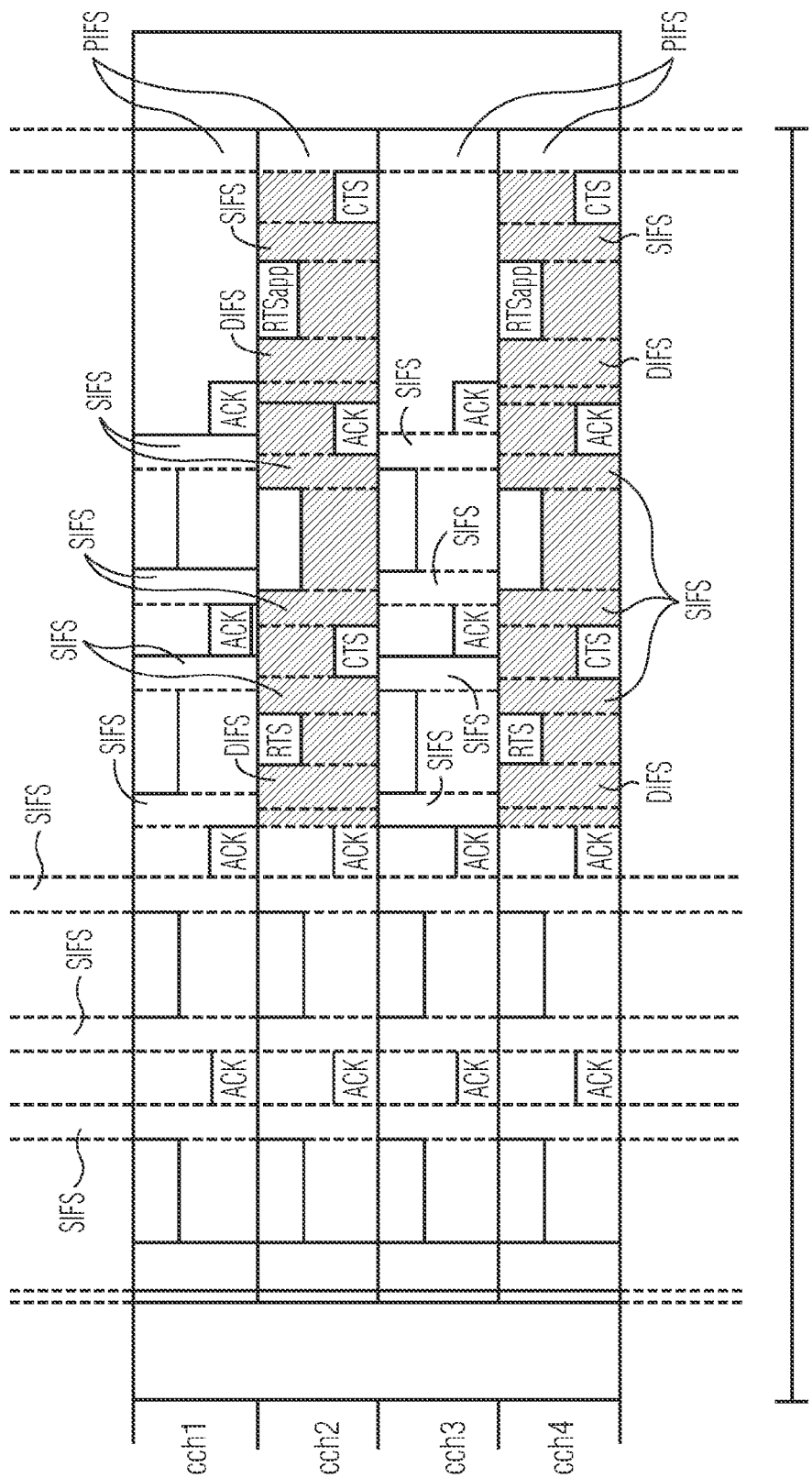
FIG. 5 is a conceptual view of a timing diagram in accordance with an example embodiment.

As shown in FIG. 5, CFP expires after 40% of superframe duration in two cchs. CP operation is then allowed in cch 2 and cch 4. According to the TBTT announcement in the last beacon frame, the AP starts the beacon transmission, after sensing the channel free for an interval Point coordination function InterFrame Space (PIFS). In order to avoid collisions with beacon, resource grants for CFP consider the TBTT, and STAs operating in CP, which received the previous beacon, should abstain from transmissions when TBTT approaches.

In view of this disclosure it is noted that the various methods and devices described herein can be implemented in hardware and software. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

What is claimed is:

1. A method of wireless communication in a network of wireless stations, the method comprising:
   providing a plurality of code channels (cchs) in a single frequency channel;

allocating at least one contention free period (CFP) in at least one of the code channels; and allocating at least one contention period (CP) in a corresponding another one of said code channels, wherein said at least one contention period (CP) commences concurrently with the CFP.

2. The method as recited in claim 1, further comprising providing a plurality of contention periods in respective code channels commencing concurrently.

3. The method as recited in claim 2, further comprising providing a cumulative clear to send (CTScum) after a beacon period.

4. The method as recited in claim 1, wherein the providing and the allocating are effected in a superframe.

5. The method as recited in claim 1, further comprising:
signaling to an access point (AP) an amount of data to be transmitted by a wireless station (STA) either the amount of data to be transmitted, or a request for transmissions according to a traffic class.

6. The method as recited in claim 5, wherein the signaling further comprises transmission of an RTSapp frame.

7. The method as recited in claim 1, further comprising: signaling of traffic to be transmitted during the CFP in a control frame.

8. The method as recited in claim 7, wherein the frame includes information for forthcoming transmissions during CFP in each of the code channels.

9. The method as recited in claim 8, further comprising providing addresses of the corresponding transmitter and receiver establishing a connection.

10. The method as recited in claim 8, further comprising connection identifiers.

11. A wireless network, comprising:
a plurality of wireless stations (STAs);
an access point (AP) operative to grant access to a wireless medium to the STAs;
a superframe having a plurality of code channels (cchs) in as single frequency channel;
at least one contention free period (CFP) in at least one of the code channels; and
at least one contention period (CP) in a corresponding another one of said code channels, wherein said at least one contention period (CP) commences concurrently with the CFP.

12. The wireless network as claimed in claim 11, wherein the superframe further comprises a plurality of contention periods in respective code channels commencing concurrently.

13. The wireless network as claimed in claim 11, wherein the superframe further comprises a cumulative clear to send (CTScum) after a beacon period.

* * * * *